(12) United States Patent
Bogot (10) Patent No.: US 7,337,464 B2
(45) Date of Patent: Feb. 26, 2008

(54) SET-TOP BOX REFORMATTER

(75) Inventor: Carmi Bogot, Maaleh Adumim (IL)

(73) Assignee: NDS Limited, Middlesex (GB)

(*) Notice: Subject to any disclaimer, the term of this patent is extended or adjusted under 35 U.S.C. 154(b) by 1339 days.

(21) Appl. No.: 10/159,967

(22) Filed: May 31, 2002

(65) Prior Publication Data

US 2003/0086017 A1 May 8, 2003

Related U.S. Application Data

(63) Continuation of application No. PCT/IL02/00371, filed on May 14, 2002.

(60) Provisional application No. 60/342,047, filed on Dec. 19, 2001, provisional application No. 60/334,021, filed on Nov. 28, 2001, provisional application No. 60/332,786, filed on Nov. 5, 2001.

(51) Int. Cl.
*H04N 7/16* (2006.01)

(52) U.S. Cl. ............... 725/151; 725/68; 348/558

(58) Field of Classification Search .............. 725/39, 725/69, 98; 348/558, 726; 380/43; 370/537; 715/804
See application file for complete search history.

(56) References Cited

U.S. PATENT DOCUMENTS

| 5,666,170 | A | * | 9/1997 | Stewart | 348/726 |
| 5,970,386 | A | * | 10/1999 | Williams | 725/69 |
| 5,982,413 | A | * | 11/1999 | Irie et al. | 725/98 |
| 6,134,419 | A | | 10/2000 | Williams | 455/6.2 |
| 6,175,577 | B1 | * | 1/2001 | Van Den Heuvel | 370/537 |
| 6,292,187 | B1 | * | 9/2001 | Gibbs et al. | 715/804 |
| 6,307,937 | B1 | * | 10/2001 | Dillon et al. | 380/43 |
| 7,150,029 | B1 | * | 12/2006 | Ebling et al. | 725/39 |
| 2003/0086017 | A1 | * | 5/2003 | Bogot | 348/558 |

OTHER PUBLICATIONS

EBU Project Group B/CA "Functional model of a conditional access system" *EBU Technical Review*, No. 266, p. 64-77, Winter 1995.
"NDS Guide to Conditional Access" available from NDS Limited, One London Road, Staines, Middlesex, TW18 4EX, UK, Aug. 20, 2000.
"NDS Guide to Conditional Access" available from NDS Limited, One London Road, Staines, Middlesex, TW18 4EX, UK, 2001.
ETSI EN 300 468 V1.4.1, "Digital Video Broadcasting (DVB); Specification for Service Information (SI) in DVB systems" *European Standard (Telecommunications series)*, Nov. 2000.
ETR 162, "Digital broadcasting systems for television, sound and data services; Allocation of Service Information (SI) codes for Digital Video Broadcasting . . . systems" *ETSI Tecnhical Report*, Oct. 1995.

(Continued)

*Primary Examiner*—Christopher Grant
*Assistant Examiner*—Oschta Montoya
(74) *Attorney, Agent, or Firm*—Ladas And Parry LLP (57) ABSTRACT

A broadcasting system including a transmitter operative to transmit a signal in a first transmission format, a receiver operative to receive the signal, a reformatter operative to reformat the received signal into a second transmission format, and a set-top box (STB) operative to decode the second-transmission-formatted signal.

19 Claims, 7 Drawing Sheets

OTHER PUBLICATIONS

TR 101 200 V1.1.1, "Digital Video Broadcasting (DVB); A guideline for the use of DVB specifications and standards" *Technical Report*, Sep. 1997.

ETS 300 421, "Digital broadcasting systems for television, sound and data services; Framing structure, channel coding and modulation for . . . services" *European Telecommunication Standard*, Dec. 1994.

EN 300 421 V1.1.2, "Digital Video Broadcasting (DVB); Framing structure, channel coding and modulation for 11/12 GHz . . . services" *European Standard (Telecommunications series)*, Aug. 1997.

TR 101 198 V1.1.1, "Digital Video Broadcasting (DVB); Implementation of Binary Phase Shift Keying (BPSK) modulation in DVB satellite transmission systems" *Technical Report*, Sep. 1997.

ETSI TR 101 154 V1.4.1, "Digital Video Broadcasting (DVB); Implementation guidelines for the use of MPEG-2 Systems, Video and Audio in satellite, cable . . . applications" *Technical Report*, Jul. 2000.

ETR 289, "Digital Video Broadcasting (DVB); Support for use of scrambling and Conditional Access (CA) within digital broadcasting systems" *ETSI Tecnhical Report*, Oct. 1996.

TS 101 197-1 V1.1.1, "Digital Video Broadcasting (DVB); DVB SimulCrypt; Part 1: Head-end architecture and synchronization" *Technical Specification*, Jun. 1997.

TS 101 197-1 V1.2.1, "Digital Video Broadcasting (DVB); DVB SimulCrypt: Head-end architecture and synchronization" *Technical Specification*, Feb. 2002.

ETSI TS 103 197 V1.1.1, "Digital Video Broadcasting (DVB); Head-end implementation of DVB SimulCrypt" *Technical Specification*, Jun. 2000.

ETSI TS 103 197 V1.2.1, "Digital Video Broadcasting (DVB); Head-end implenetation of DVB SimulCrypt" *Technical Specification*, Jan. 2002.

Draft ETSI TR 101 162 V1.2.1, "Digital Video Broadcasting (DVB); Allocation of Service Information (SI) and Data Broadcasting Codes . . . systems" *Technical Report*, Jul. 2001.

* cited by examiner

SET-TOP BOX REFORMATTER

CROSS-REFERENCE TO RELATED APPLICATIONS

This application is a continuation of PCT Patent Application Ser. No. PCT/IL02/00371, filed May 14, 2002, entitled "Set-top-box re-formatter", claims the benefit thereof and incorporates herein by reference its entirety. This application also claims the benefit of U.S. Provisional Patent Application Ser. No. 60/332,786, filed Nov. 5, 2001, entitled "Set-top-box re-formatter" and incorporates herein by reference its entirety; U.S. Provisional Patent Application Ser. No. 60/334,021, filed Nov. 28, 2001, entitled "Set-top-box re-formatter" and incorporates herein by reference its entirety; and U.S. Provisional Patent Application Ser. No. 60/342,047, filed Dec. 19, 2001, entitled "Set-top-box re-formatter" and incorporates herein by reference its entirety, all of which were filed in English.

FIELD OF THE INVENTION

The present invention relates to television broadcasting systems in general, and more particularly to set-top box decoding systems therefor.

BACKGROUND OF THE INVENTION

It is well-known in the art of media broadcasting that various signal transmission formats may be used to broadcast signals. For example, some satellite television broadcasters transmit digital television signals using the Digital Satellite System (DSS) format, while others transmit digital television signals using the Digital Video Broadcast (DVB-S) format. A signal that is transmitted using a particular format is typically decoded by a set-top box that is configured to decode that format. In many cases this configuration is implemented at the hardware level, making it difficult or impossible to change the existing set-top box to accommodate different formats. Transmission formats may differ in several ways, such as their packet size, with DSS using smaller packets than DVB-S, and in the scrambling algorithm they use, with DSS using the Data Encryption Standard (DES) while DVB-S uses the DVB Common Scrambling Algorithm.

In some regions of the world broadcasters transmit content using multiple transmission formats simultaneously in order to serve customers with different types of set-top boxes. Not only is this an inefficient use of bandwidth, but it also very costly to do so rather to switch to a single transmission format and replace a large installed base of incompatible set-top boxes with compatible devices.

DVB-S, referred to above, is a published standard whose details are well-known in the art; see, for example, www.dvb.org. Some of the key standards include ETS 300 468 and ETR 162.

Conditional Access as a means of controlling access to broadcast items is well-known in the art. References on Conditional Access include the following:

1. "Functional Model of a Conditional Access System", EBU Review-Technical, no. 266, Dec. 21, 1995, pages 64-77, Grand-Saconnex, Switzerland.

2. NDS Guide to Conditional Access, August 2000, available from NDS Limited, One London Road, Staines, Middlesex, UK.

SUMMARY OF THE INVENTION

The present invention, in preferred embodiments thereof, allows a region to switch to a single transmission format and save bandwidth, without having to replace a large installed base of set-top boxes.

The present invention, in preferred embodiments thereof, provides a system, preferably implemented in a suitable combination of hardware and software in or associated with a set-top box, that accepts as input a broadcast signal formatted according to a first format (e.g., the DSS format) and provides an output signal adapted for use with a set-top box that is configured to decode a second format (e.g., the DVB-S format).

It is appreciated throughout the specification and claims that, while the present invention may be described in terms of the conversion of a first format being the DSS format to a second format being the DVB-S format, the present invention may be used to convert between any appropriate known formats and in any direction using any appropriate known conversion techniques.

In one aspect of the present invention a broadcasting system is provided including a transmitter operative to transmit a signal in a first transmission format, a receiver operative to receive the signal, a reformatter operative to reformat the received signal into a second transmission format, and a set-top box (STB) operative to decode the second-transmission-formatted signal.

In another aspect of the present invention the transmitter is a satellite.

In another aspect of the present invention one of the formats is a DSS format and where the other of the formats is a DVB format.

In another aspect of the present invention the reformatter is externally connected to the set-top box, and the reformatter and the set-top box communicate via a coaxial channel.

In another aspect of the present invention the reformatter is externally connected to the set-top box, and the reformatter and the set-top box communicate via a serial communications link.

In another aspect of the present invention the reformatter includes a demodulator operative to receive a signal in a first format and demodulate the signal into a data stream, and a reformatter core operative to reformat the data stream into a second format.

In another aspect of the present invention the reformatter further includes a decryption module operative to decrypt the data stream, a conditional access module operative to determine whether or not to provide access to the data stream content, and a modulator operative to modulate the reformatted data stream.

In another aspect of the present invention the reformatter is operative to map a DSS Service Channel Identifier (SCID) in the first-transmission-formatted signal to a DVB-S Program Identifier (PID), convert DSS Channel Information (CI) tables in the first-transmission-formatted signal to DVB Service Information (SI) and Programme Specific Information (PSI) tables, and create a DVB-S packet from the PID, SI, and PSI information.

In another aspect of the present invention the reformatter is operative to pad the DVB-S packet with DVB-compliant filler information until a predetermined packet size is reached.

In another aspect of the present invention the system further includes a headend operative to produce a DSS packet including a DSS header and a DSS data payload, the DSS header having a trojan SCID, format DVB-SI and DVB-PSI data to fit into the DSS data payload, transmit the DSS packet via the transmitter, and the reformatter is operative to receive the DSS packet, identify the received DSS packet as having a trojan SCID, map the SCID to a PID, map the DSS packet header into a DVB packet header, and create a DVB packet data payload from the DSS packet data payload.

In another aspect of the present invention the reformatter is operative to pad the DVB packet data payload with DVB-compliant filler information in order to achieve a proper DVB packet size.

In another aspect of the present invention a reformatter is provided for use with a broadcasting system, the broadcasting system transmitting a signal in a first transmission format, the reformatter being operatively associated with a receiver operative to receive the signal, the reformatter including a reformatter core operative to reformat the received signal into a second transmission format, and a set-top-box (STB) communication unit operative to communicate the second-transmission-formatted signal to a STB.

In another aspect of the present invention the reformatter further includes a demodulator operative to receive the signal in the first transmission format and demodulate the signal into a data stream, a decryption module operative to decrypt the data stream, a conditional access module operative to determine whether or not to provide access to the data stream, and a modulator operative to modulate the data stream into the second-transmission-formatted signal.

In another aspect of the present invention a method of set-top box and reformatter operation is provided, the method including entering a PID indicating a program selection into a set-top box, transmitting the PID to a reformatter, applying conditional access criteria to determine whether access to the selected program is authorized, if access is denied, sending an access denied message to the set-top box, if access is approved reformatting a signal at the reformatter into a format suitable for use by the set-top box, and transmitting the reformatted signal to the set-top box.

In another aspect of the present invention the method further includes encrypting the signal in a manner that is supported by the set-top box.

In another aspect of the present invention a method is provided for reformatting a DSS format signal into a DVB-S format signal, the method including mapping a DSS Service Channel Identifier (SCID) to a DVB-S Program Identifier (PID), converting DSS Channel Information (CI) tables to DVB Service Information (SI) and Programme Specific Information (PSI) tables, and creating a DVB-S packet from the PID, SI, and PSI information.

In another aspect of the present invention the method further includes padding the DVB-S packet with DVB-compliant filler information until a predetermined packet size is reached.

In another aspect of the present invention a method is provided for reformatting a DSS format signal into a DVB-S format signal, the method including producing a DSS packet including a DSS header and a DSS data payload, the DSS header having a trojan SCID, formatting DVB-SI and DVB-PSI data to fit into the DSS data payload, transmitting the DSS packet, receiving the DSS packet, identifying the received DSS packet as having a trojan SCID, mapping the SCID to a PID, mapping the DSS packet header into a DVB packet header, and creating a DVB packet data payload from the DSS packet data payload.

In another aspect of the present invention the method further includes padding the DVB packet data payload with a standard DVB padding section in order to achieve a proper DVB packet size.

The disclosures of all patents, patent applications, and other publications mentioned in this specification and of the patents, patent applications, and other publications cited therein are hereby incorporated by reference in their entirety.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1A:
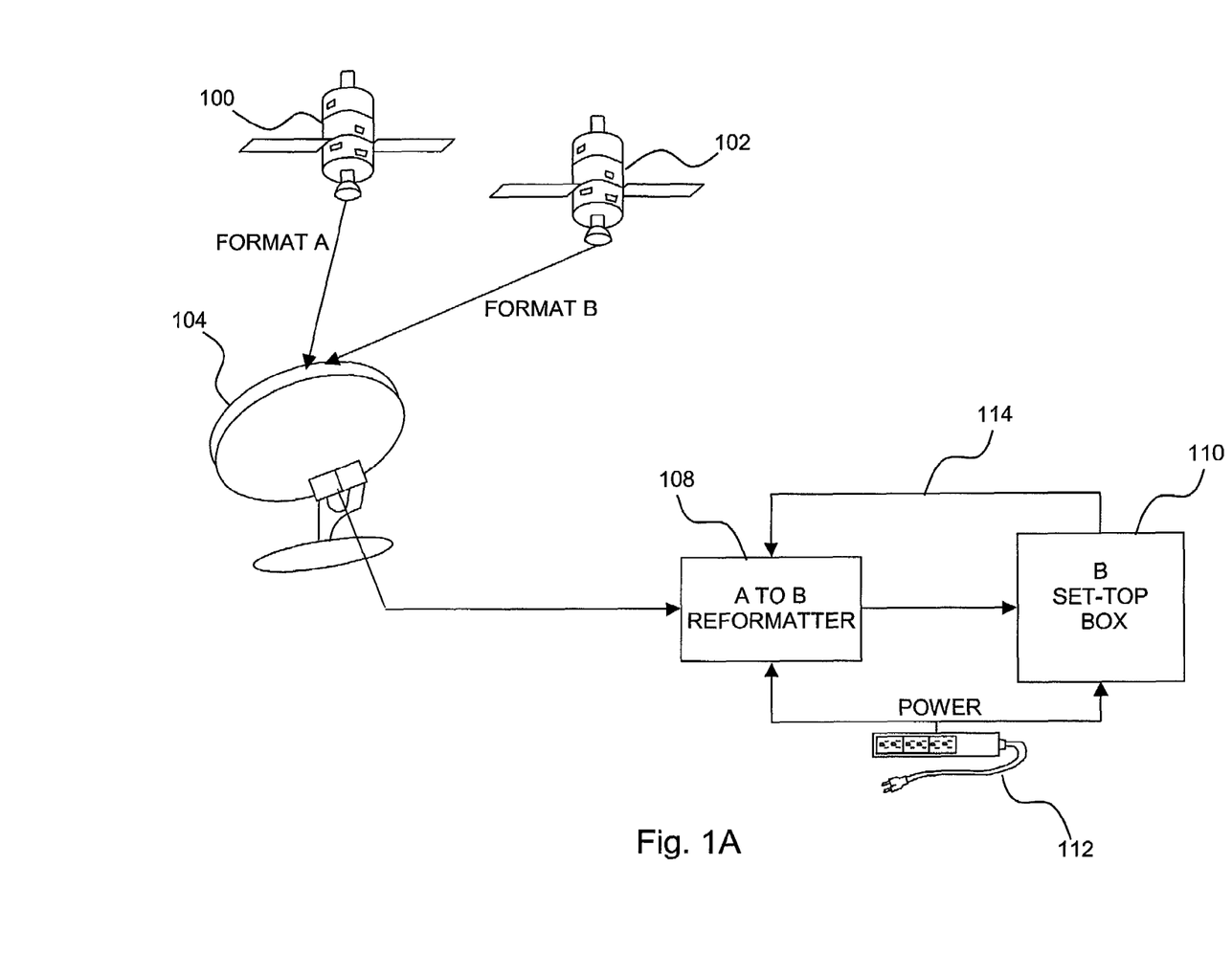
FIGS. 1A and 1B are simplified conceptual illustrations of a broadcasting system, constructed and operative in accordance with preferred embodiments of the present invention.
Figure 1B:
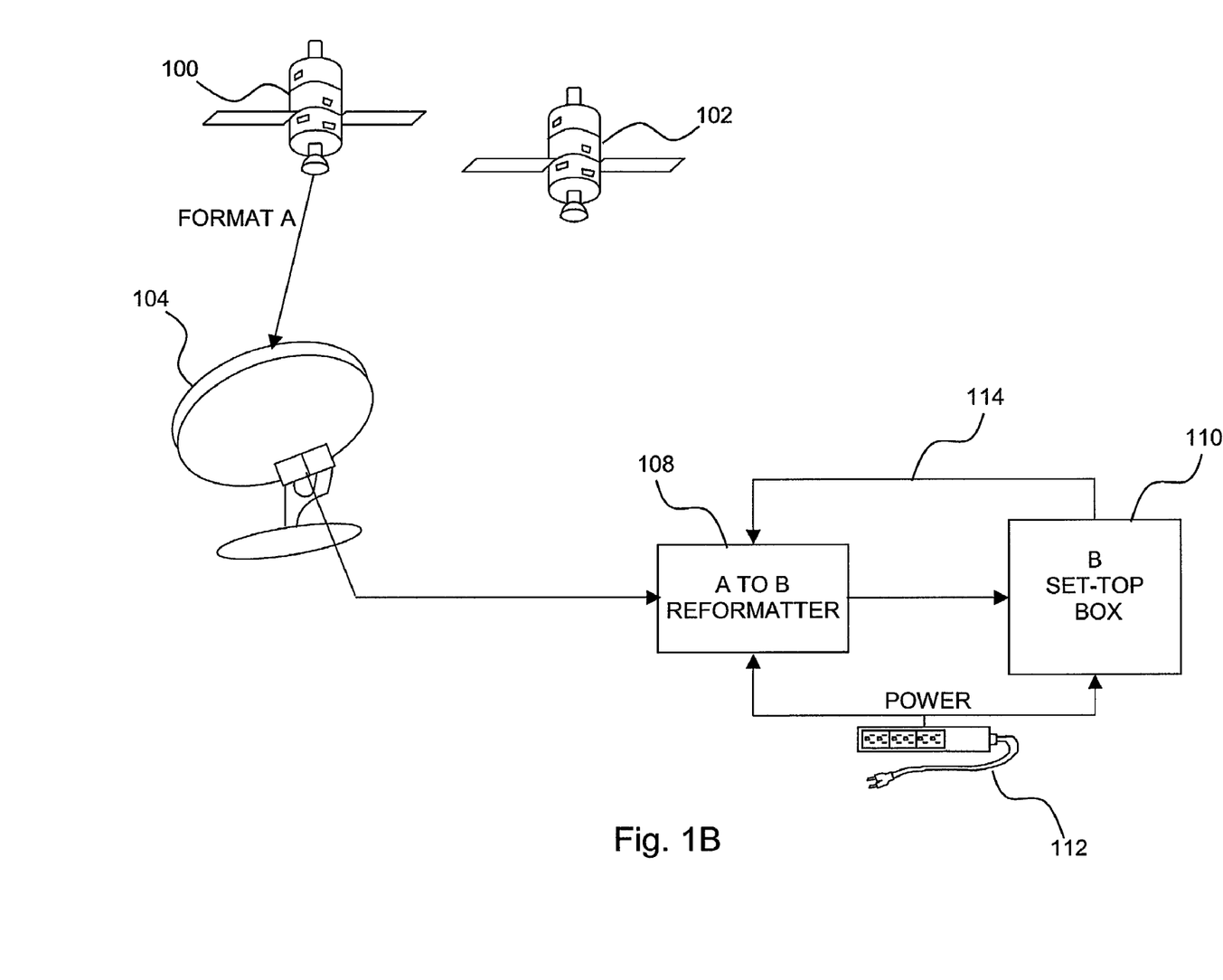

Reference is now made to FIGS. 1A and 1B, which are simplified conceptual illustrations of a broadcasting system, constructed and operative in accordance with preferred embodiments of the present invention. In the system of FIG. 1A a satellite 100 is shown transmitting a signal in a transmission format A, such as DSS, and a satellite 102 is shown transmitting a signal in a transmission format B, such as DVB-S. The signals are received at a receiver 104 and passed to an A-to-B Reformatter 108. Reformatter 108 converts signals formatted in format A to format B and passes the converted signal to a set-top box (STB) 110 that is configured to decode signals in format B. Reformatter 108 and STB 110 may be powered by a power source 112. STB 110 is also shown as having a communications link 114 with Reformatter 108 as is described in greater detail hereinbelow.

Alternatively, as is shown in FIG. 1B, receiver 104 receives only format A signals from satellite 100 which are passed to Reformatter 108.

It is appreciated that, although the present invention is described herein within the context of a digital satellite broadcasting system, the present invention may be embodied within any number of suitable media transmission systems, such as, but not limited to, cable television systems, digital terrestrial broadcasting systems, and Internet-based media delivery systems.

Figure 2:
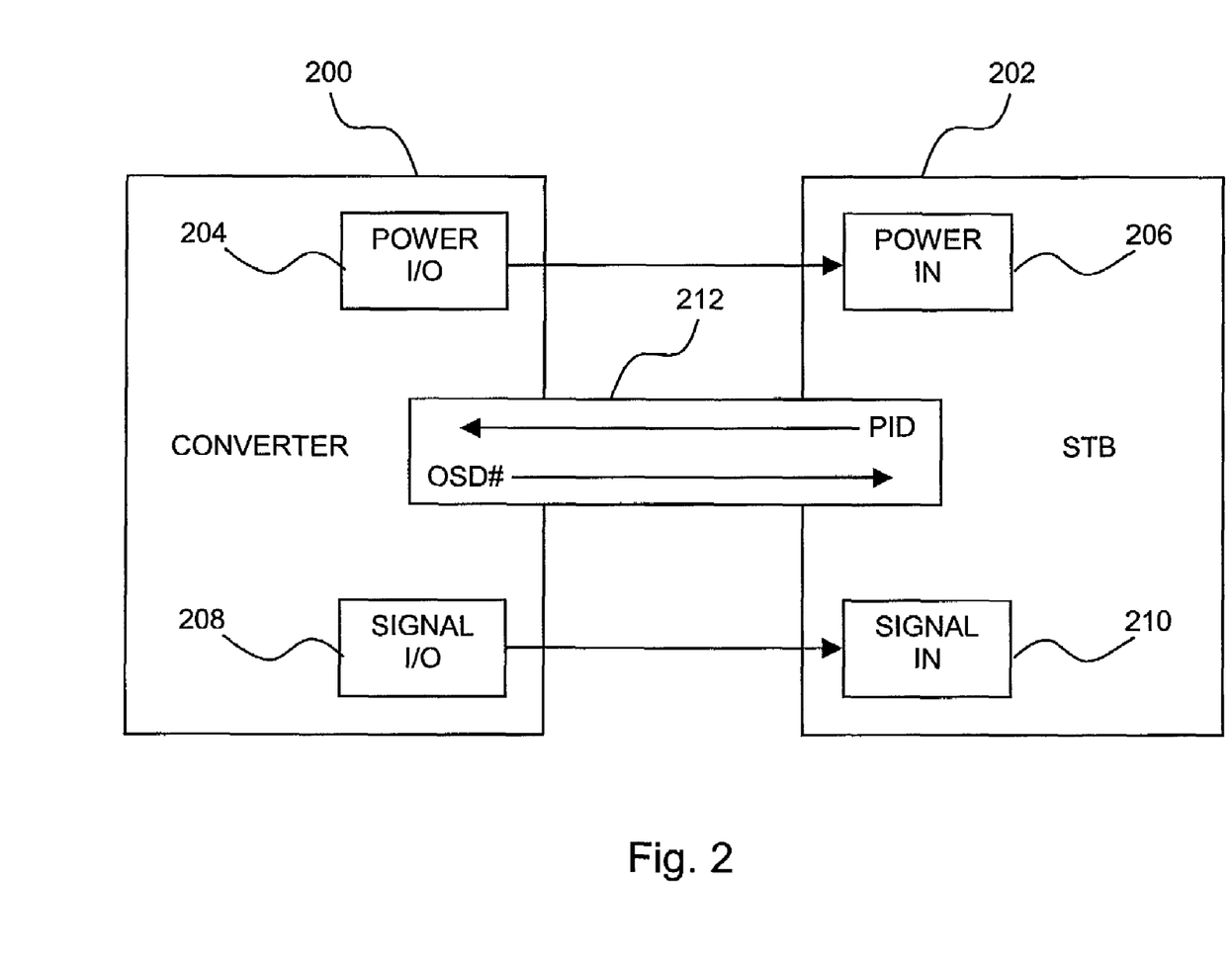
FIG. 2 is a simplified block diagram of an exemplary implementation of reformatter 108 and STB 110 of FIGS. 1A and 1B, constructed and operative in accordance with a preferred embodiment of the present invention.

Reference is now made to FIG. 2, which is a simplified block diagram of an exemplary implementation of Reformatter 108 and STB 110 of FIGS. 1A and 1B, constructed and operative in accordance with a preferred embodiment of the present invention. A Reformatter 200 is shown externally connected to an STB 202, with the Reformatter 200 preferably supplying power, such as AC, from a power I/O 204 to a power-in 206 at STB 202, and a reformatted signal from a signal I/O 208 to a signal-in 210 at STB 202, preferably along a coaxial channel. Reformatter 200 and STB 202 preferably communicate via a communications link 212, preferably being a serial link. Preferably, STB 202 is configured to provide to Reformatter 200 via link 212 a program ID (PID), such as the PID of the program that the STB is currently tuned to. Reformatter 200 is also preferably configured to provide information to STB 202 via link 212, such as an on-screen display (OSD) message or identifier to report status or error condition information.

Figure 3:
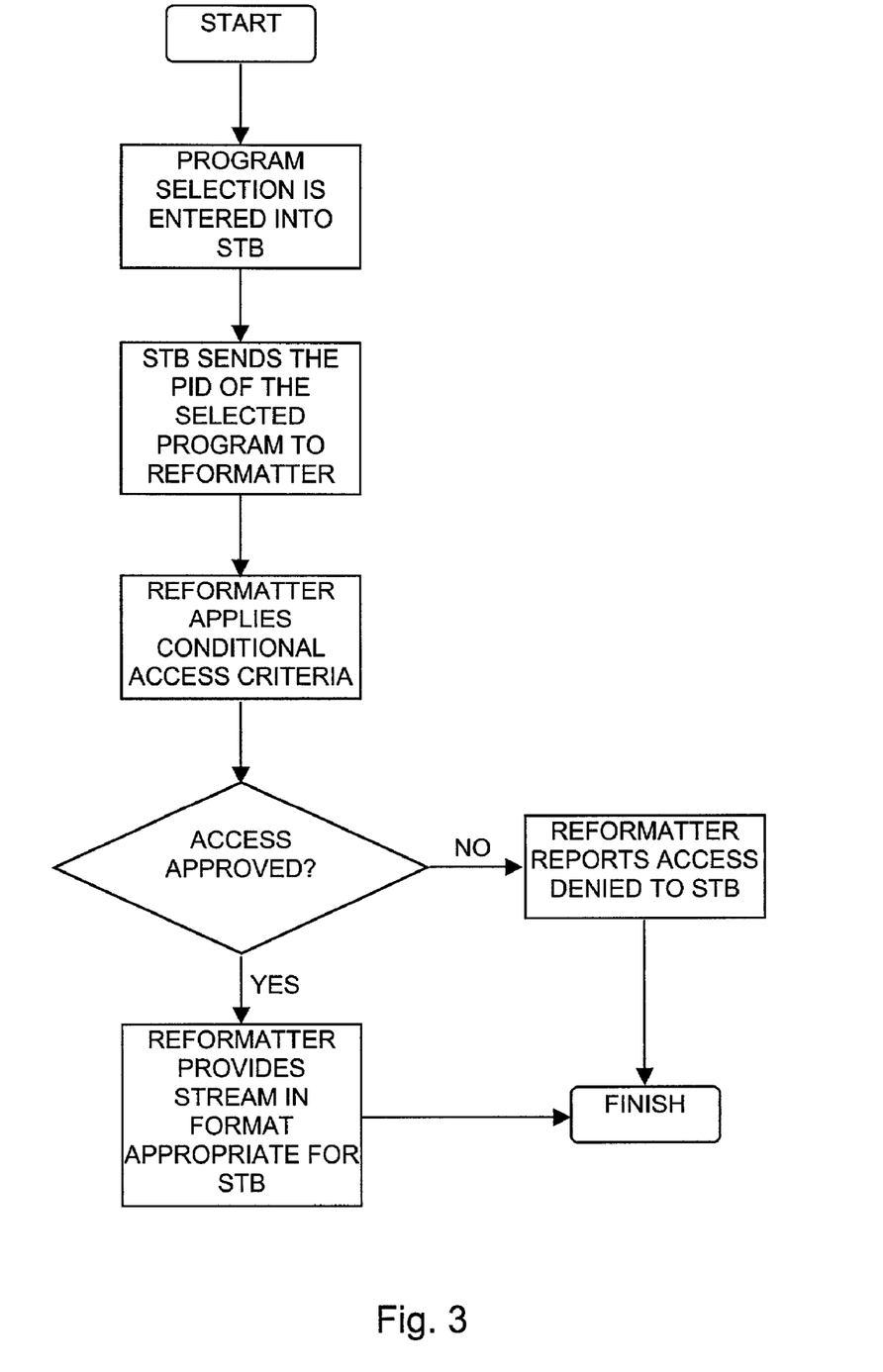
FIG. 3 is a simplified flowchart illustration of an exemplary method of operation of the system of FIG. 2, operative in accordance with a preferred embodiment of the present invention.

Reference is now made to FIG. 3, which is a simplified flowchart illustration of an exemplary method of operation of the system of FIG. 2, operative in accordance with a preferred embodiment of the present invention. In the method of FIG. 3 a program selection is entered into STB 202 using any known means. STB 202 then sends the PID of the selected program via link 212 to Reformatter 200. Reformatter 200 may then apply conditional access criteria using any known means to determine whether access to the selected program is authorized. If access is denied, an appropriate message, such as an OSD message, is sent by Reformatter 200 to STB 202 via link 212. If access is approved, Reformatter 200 produces the appropriate stream in a format suitable for use by STB 202, and transmits the signal from signal I/O 208 to signal-in 210 at STB 202. The signal may be unencrypted or optionally, if STB 202 supports receipt of encrypted signals and is it cost-effective and technically possible to re-encrypt the signal, encrypted in a manner that is supported by STB 202 and then transmitted.

Figure 4:
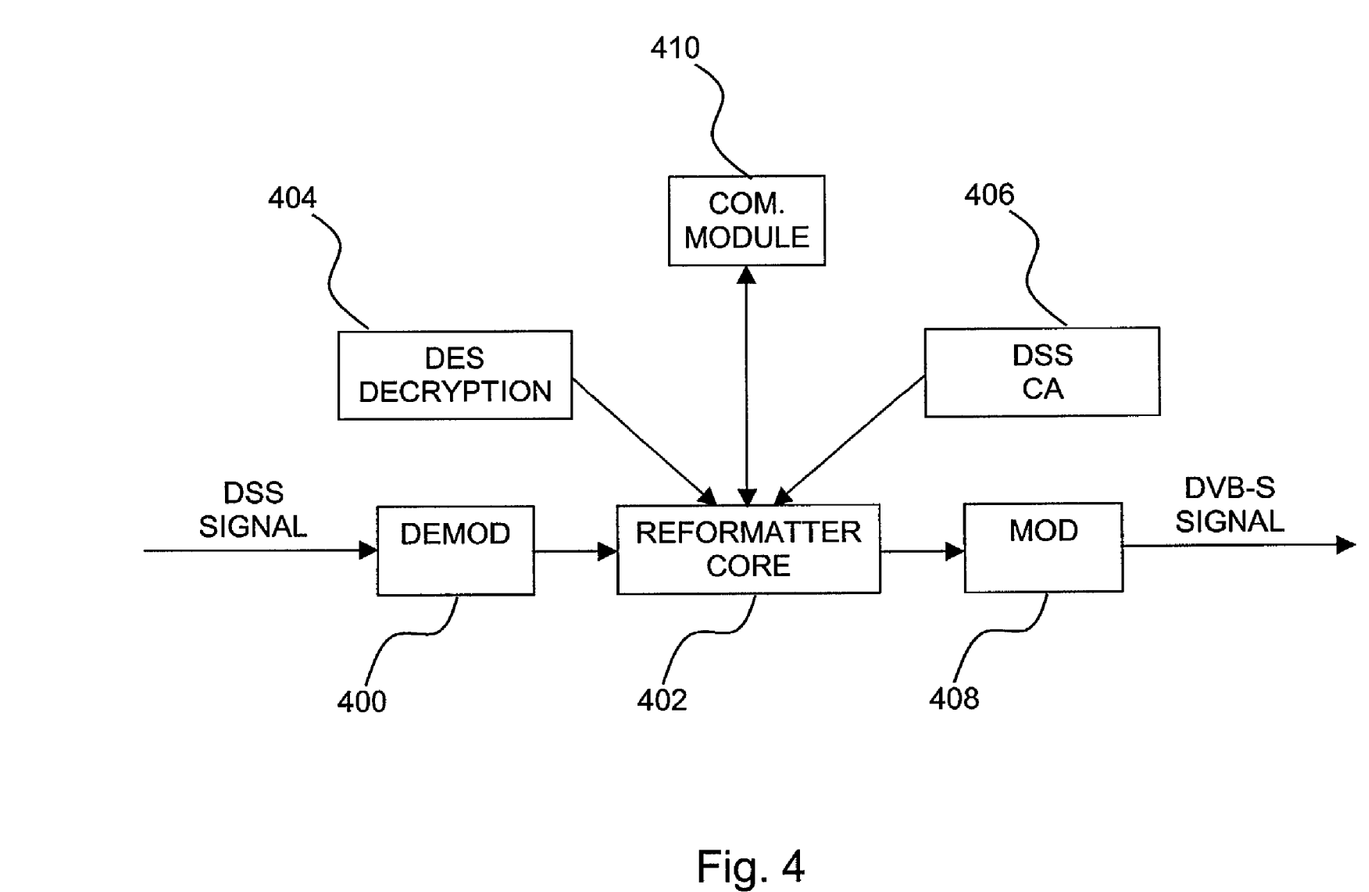
FIG. 4 is a simplified block diagram illustration of an exemplary implementation of reformatter 200 of FIG. 2, constructed and operative in accordance with a preferred embodiment of the present invention.
Figure 5:
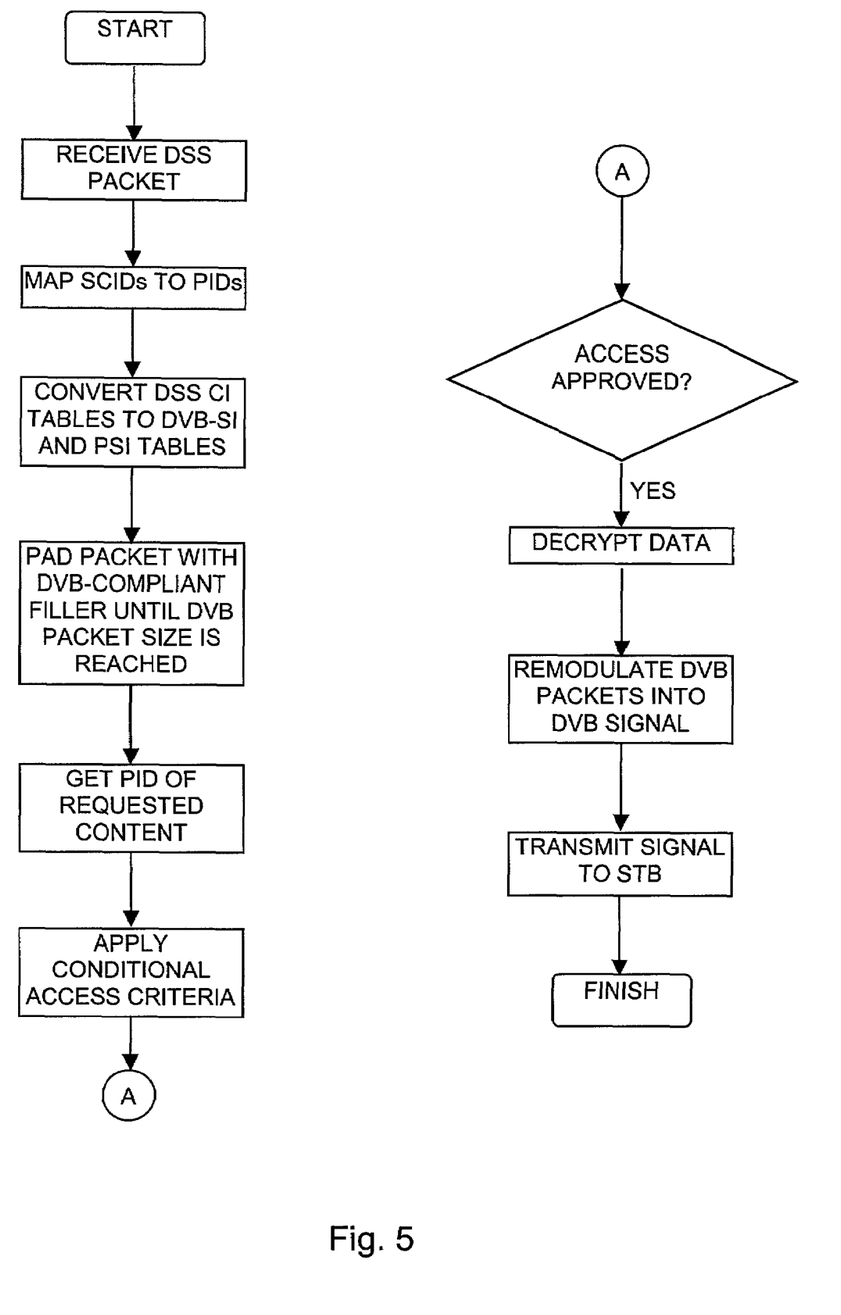
FIG. 5 is a simplified flowchart illustration of an exemplary method of operation of the implementation of FIG. 4, operative in accordance with a preferred embodiment of the present invention.

Reference is now made to FIG. 4, which is a simplified block diagram illustration of an exemplary implementation of Reformatter 200 of FIG. 2, constructed and operative in accordance with a preferred embodiment of the present invention. In the implementation of FIG. 5, a DSS format signal is reformatted into a DVB-S format signal. In the implementation of FIG. 4, a DSS signal is demodulated at a demodulator 400. A Reformatter core 402 reformats the demodulated data stream to DVB-S format. A DES decryption module 404 decrypts the data stream, while a DSS conditional access module 406 determines whether or not to provide access to the data stream content. If access is authorized, a modulator 408 modulates the reformatted data stream and provides a DVB-S format signal. A communications module 410 is shown for communicating with STB 202 (FIG. 2) via link 212.

Reference is now made to FIG. 5, which is a simplified flowchart illustration of an exemplary method of operation of the implementation of FIG. 4, operative in accordance with a preferred embodiment of the present invention. In the method of FIG. 5, a DSS format signal is reformatted into a DVB-S format signal as follows. A 188-byte DVB-S packet is created from each 133-byte DSS packet using conventional techniques. Each DSS Service Channel Identifier (SCID) is then mapped to a DVB-S Program Identifier (PID), and DSS Channel Information (CI) tables are converted to DVB Service Information (SI) and Program-Specific Information (PSI) tables. DVB-compliant filler information is then created to pad the packet until the desired packet size is reached. The PID of the requested content is received from the STB via the communication link. Conditional access logic is then applied and the data is decrypted if access is authorized. The DVB data packets are then remodulated into a DVB-S signal that is then transmitted to the STB.

Figure 6:
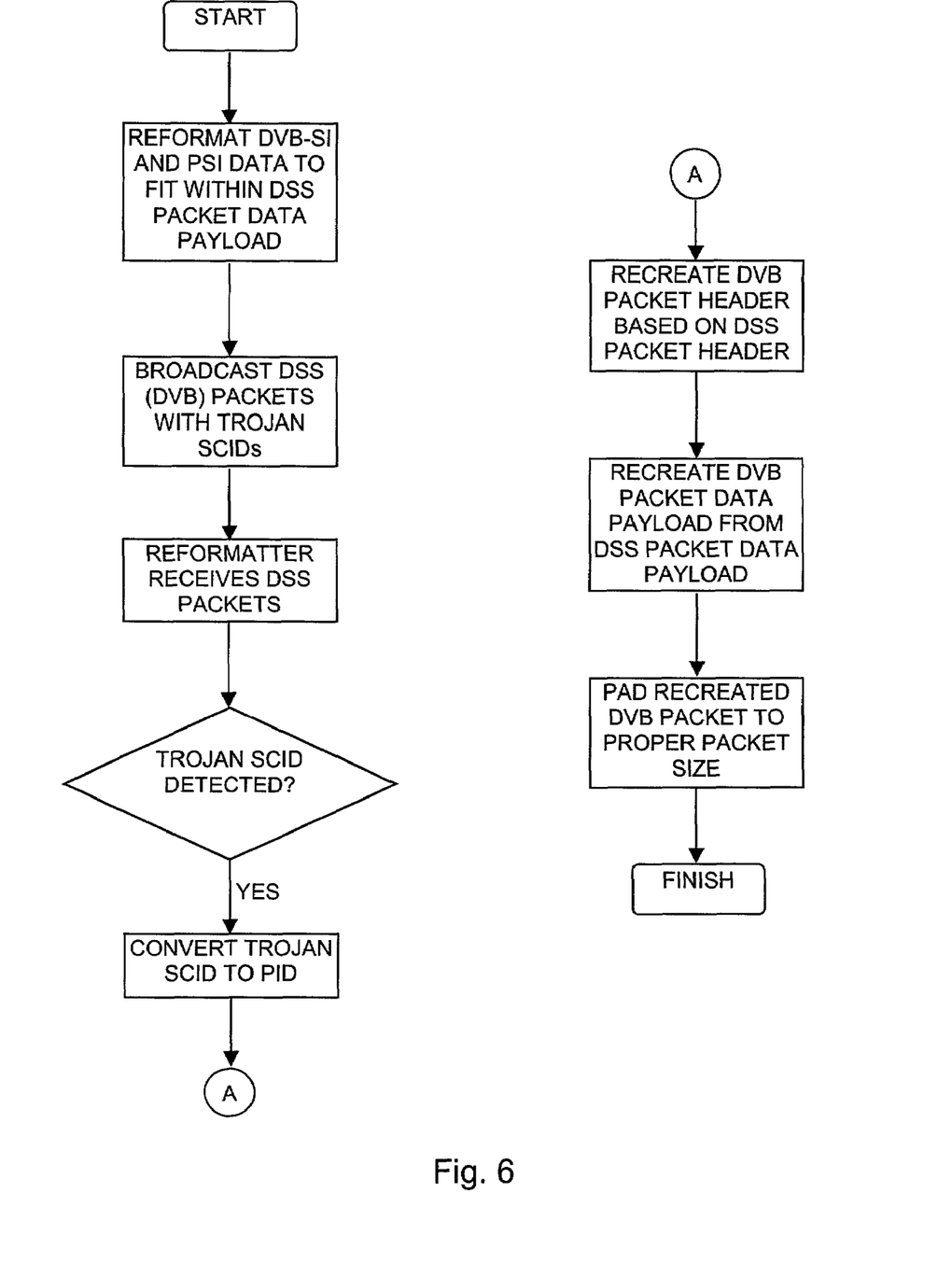
FIG. 6, which is a simplified flowchart illustration of an alternative exemplary method of operation of the implementation of FIG. 4, operative in accordance with a preferred embodiment of the present invention.

Reference is now made to FIG. 6, which is a simplified flowchart illustration of an alternative exemplary method of operation of the implementation of FIG. 4, operative in accordance with a preferred embodiment of the present invention. In the method of FIG. 6, a DSS format signal is reformatted into a DVB-S format signal as follows. The broadcast Headend preprocesses the transmitted data in order to simplify the operation of the Reformatter. Preferably, the Headend produces a DSS packet including a DSS header. DVB-SI and DVB-PSI data are then formatted to fit into the remaining 127-byte data payload of the DSS packet. The packets are broadcast on SCIDs that will be ignored by DSS set-top boxes. This may be done by excluding any mention of these SCIDs in the DSS CI information. The Reformatter is configured to recognize these SCIDs, now referred to as "trojan" SCIDs, as identifying a DSS packet that contains DVB information. In order to recreate DVB-SI and PSI packets from DSS packets, Reformatter 200 identifies DSS packets having trojan SCIDs and converts the trojan SCID to a PID using a predefined mapping of SCIDs to PIDs. Reformatter 200 then maps the remaining DSS packet header information into a DVB packet header, and creates a DVB packet data payload from the DSS packet data payload, padding the data payload with a standard DVB padding section in order to achieve the proper DVB packet size if necessary.

It is appreciated that other preferred embodiments of the present invention are possible. For example, the Reformatter of the present invention may receive its power from the STB via coaxial connection, or the STB may receive its power from the Reformatter in the same way, thereby eliminating a power connection and simplifying the invention. As a further example, the coaxial connection between the Reformatter and the STB may also serve as the communications link, thereby obviating the need for a separate communications link. Communications from the STB to the Reformatter may be accomplished using the same command language that the STB uses to communicate with a low noise block (LNB) to tune channels. Preferably, the PID is also added to such communications. Communications from the Reformatter to the STB may be accomplished by inserting an appropriate Entitlement Control Message (ECM) into the broadcast stream. For example, where the Reformatter wishes to display a message on the screen, such as "Program Not Authorized," the Reformatter may insert an ECM to this effect into the stream which the STB may decode and cause to be displayed.

It is further appreciated that the Reformatter of the present invention may be implemented as a device that is separate from the STB, such as is described hereinabove, or may be integrated into an STB. Persons skilled in the art will appreciate the changes necessary for producing an integrated STB/Reformatter.

It is appreciated that one or more of the steps of any of the methods described herein may be omitted or carried out in a different order than that shown, without departing from the true spirit and scope of the invention.

While the methods and apparatus disclosed herein may or may not have been described with reference to specific hardware or software, it is appreciated that the methods and apparatus described herein may be readily implemented in hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A broadcasting system comprising:
   a transmitter operative to transmit a signal in a first transmission format;
   a receiver operative to receive said signal;
   a reformatter operative to reformat said received signal into a second transmission format; and
   a set-top box (STB) operative to decode said second-transmission-formatted signal,
   wherein said set-top box is further operative to enter a PID corresponding to a selected program and to provide the PID to said reformatter, and said reformatter is further operative to receive the PID from the STB and to reformat the signal into the second transmission format based on the determination of a conditional access module.

2. A system according to claim 1 wherein said transmitter is a satellite.

3. A system according to claim 1 wherein one of said formats is a DSS format and wherein the other of said formats is a DVB format.

4. A system according to claim 1 wherein said reformatter is externally connected to said set-top box, and wherein said reformatter and said set-top box communicate via a coaxial channel.

5. A system according to claim 1 wherein said reformatter is externally connected to said set-top box, and wherein said reformatter and said set-top box communicate via a serial communications link.

6. A system according to claim 1 wherein said reformatter comprises:
   a demodulator operative to receive a signal in a first format and demodulate said signal into a data stream; and
   a reformatter core operative to reformat said data stream into a second format.

7. A system according to claim 6 wherein said reformatter further comprises:
   a decryption module operative to decrypt said data stream;
   a conditional access module operative to determine whether or not to provide access to said data stream content; and
   a modulator operative to modulate said reformatted data stream.

8. A system according to claim 1 wherein said reformatter is operative to:
   map a DSS Service Channel Identifier (SCID) in said first-transmission-formatted signal to a DVB-S Program Identifier (PID);
   convert DSS Channel Information (CI) tables in said first-transmission-formatted signal to DVB Service Information (SI) and Programme Specific Information (PSI) tables; and
   create a DVB-S packet from said PID, SI, and PSI information.

9. A system according to claim 8 wherein said reformatter is operative to pad said DVB-S packet with DVB-compliant filler information until a predetermined packet size is reached.

10. A broadcasting system comprising:
    a transmitter operative to transmit a signal in a first transmission format;
    a receiver operative to receive said signal;
    a reformatter operative to reformat said received signal into a second transmission format;
    a set-top box (STB) operative to decode said second-transmission-formatted signal; and
    a headend operative to:
       produce a DSS packet including a DSS header and a DSS data payload, said DSS header having a trojan SCID;
       format DVB-SI and DVB-PSI data to fit into said DSS data payload;
       transmit said DSS packet via said transmitter;
    and wherein said reformatter is operative to:
       receive said DSS packet;
       identify said received DSS packet as having a trojan SCID;
       map said SCID to a PID;
       map said DSS packet header into a DVB packet header; and
       create a DVB packet data payload from said DSS packet data payload.

11. A system according to claim 10 wherein said reformatter is operative to pad said DVB packet data payload with DVB-compliant filler information in order to achieve a proper DVB packet size.

12. A reformatter for use with a broadcasting system, the broadcasting system transmitting a signal in a first transmission format, the reformatter being operatively associated with a receiver operative to receive said signal, the reformatter comprising:
    a reformatter core operative to reformat said received signal into a second transmission format;
    a set-top-box (STB) communication unit operative to communicate said second-transmission-formatted signal to a STB;
    a demodulator operative to receive said signal in said first transmission format and demodulate said signal into a data stream;
    a decryption module operative to decrypt said data stream;
    a conditional access module operative to determine whether or not to provide access to said data stream; and
    a modulator operative to modulate said data stream into said second-transmission-formatted signal;
    wherein said reformatter is further operative to receive a PID corresponding to a selected program from an STB and to reformat the signal into the second transmission format based on the determination of said conditional access module.

13. A method of set-top box and reformatter operation, the method comprising:
    entering a PID indicating a program selection into a set-top box;
    transmitting said PID to a reformatter;
    applying conditional access criteria to determine whether access to said selected program is authorized;

if access is denied, sending an access denied message to said set-top box;
if access is approved:
reformatting a signal at said reformatter into a format suitable for use by said set-top box; and
transmitting said reformatted signal to said set-top box.

14. A method according to claim 13 wherein the method further comprises encrypting said signal in a manner that is supported by said set-top box.

15. a method according to claim 13 wherein said applying condintional access criteria comprises applying condintional acces criteria at said reformatter.

16. A method for reformatting a DSS format signal into a DVB-S format signal, the method comprising:
producing a DSS packet including a DSS header and a DSS data payload, said DSS header having a trojan SCID;
formatting DVB-SL and DVB-PSI data to fit into said DSS data payload;
transmitting said DSS packet;
receiving said DSS packet;
identifying said received DSS packet as having a trojan SCID;
mapping said SCID to a PID;
mapping said DSS packet header into a DVB packet header; and
creating a DVB packet data payload from said DSS packet data payload.

17. A method according to claim 16 wherein said method further comprises padding said DVB packet data payload with a standard DVB padding section in order to achieve a proper DVB packet size.

18. A set-top box comprising:
a receiver operative to receive a signal transmitted in a first transmission format; and
a reformatter operative to reformat the received signal into a second transmission format,
wherein the first transmission format includes a DSS header and a DSS data payload, the DSS header including a trojan SCID and DVB-PSI data fit into the DSS data payload; and
said set-top box (STB) is operative to decode the second-transmission-formatted signal; and
said reformatter is further operative to:
receive said DSS packet;
identify said received DSS packet as having a trojan SCID;
map said SCID to a PID;
map said DSS packet header into a DVB packet header; and
create a DVB packet data payload from said DSS packet data payload.

19. A method for reformatting a DSS format signal with a trojan SCID into a DVB-S format signal, the method comprising:
receiving said DSS packet;
identifying said received DSS packet as having a trojan SCID;
mapping said SCID to a PID;
mapping said DSS packet header into a DVB packet header; and
creating a DVB packet data payload from said DSS packet data payload.

* * * * *